United States Patent [19]

Ross

[11] 3,837,331
[45] Sept. 24, 1974

[54] SYSTEM AND METHOD FOR CONTROLLING THE NERVOUS SYSTEM OF A LIVING ORGANISM

[76] Inventor: Sidney A. Ross, 10535 Cedros Ave., Mission Hills, Calif. 91340

[22] Filed: Oct. 24, 1972

[21] Appl. No.: 299,842

[52] U.S. Cl. ............................... 128/1 C, 128/2.1 B
[51] Int. Cl. ......................... A61b 5/05, A61b 19/00
[58] Field of Search .............. 128/2.1 B, 2.1 R, 1 C, 128/422

[56] References Cited
UNITED STATES PATENTS

| | | | |
|---|---|---|---|
| 2,501,808 | 3/1950 | Brockway et al. | 128/1 C |
| 3,413,546 | 11/1968 | Riehl et al. | 128/2.1 B |
| 3,495,596 | 2/1970 | Condict | 128/422 |
| 3,753,433 | 8/1973 | Bakerich et al. | 128/2.1 B |

OTHER PUBLICATIONS

Med. & Biol. Engng., Vol. 8, No. 2, pp. 209–211, 1970.
The Washington Post, April 30, 1972, Sec. D3.

Primary Examiner—Kyle L. Howell
Attorney, Agent, or Firm—Spensley, Horn & Lubitz

[57] ABSTRACT

A novel method for controlling the nervous system of a living organism for therapeutic and research purposes, among other applications, and an electronic system utilized in, and enabling the practice of the invented method. Bioelectrical signals generated in specific topological areas of the organism's nervous system, typically areas of the brain, are processed by the invented system so as to produce an output signal which is in some way an analog of selected characteristics detected in the bioelectrical signal. The output of the system, typically an audio or visual signal, is fed back to the organism as a stimulus. Responding to the stimulus, the organism can be trained to control the waveform pattern of the bioelectrical signal generated in its own nervous system.

The invention system comprises means for frequency filtering, rectifying, integrating and amplifying. In addition, the system includes means for transducing the processed signal and displaying it as an output to the subject.

24 Claims, 2 Drawing Figures

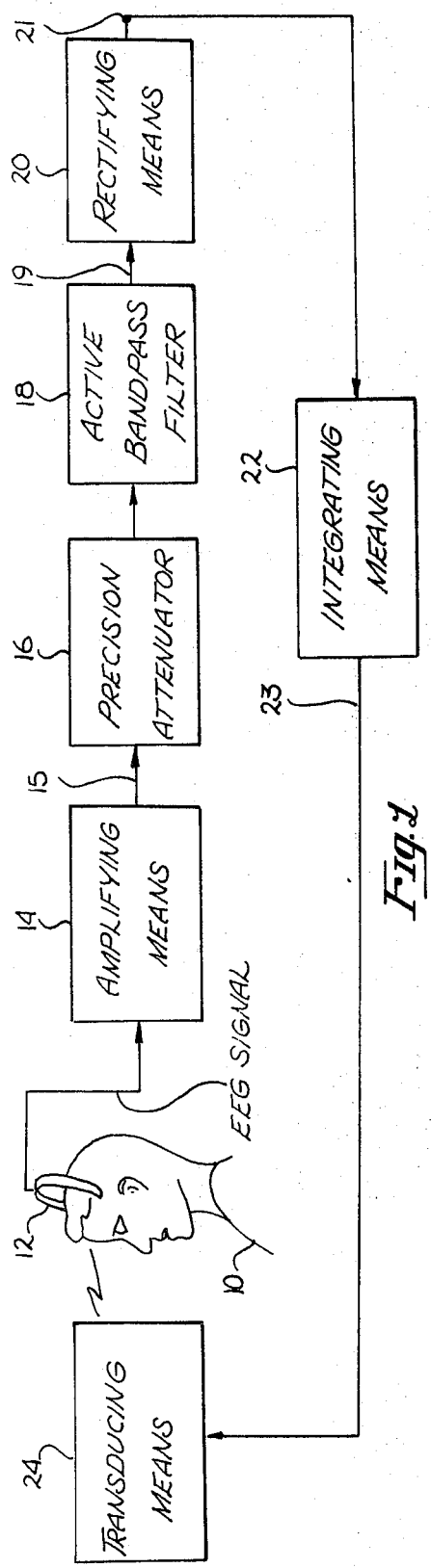
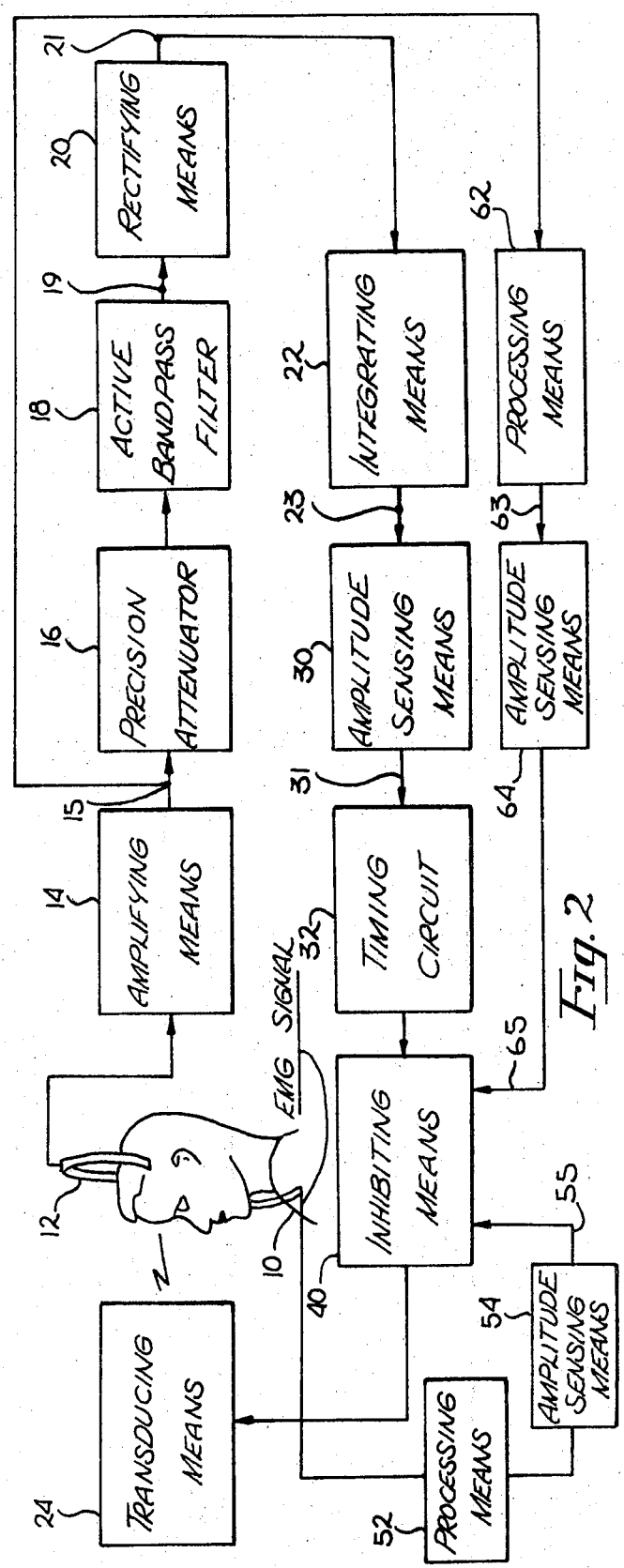
Fig. 1
Fig. 2

3,837,331

SYSTEM AND METHOD FOR CONTROLLING THE NERVOUS SYSTEM OF A LIVING ORGANISM

BACKGROUND OF THE INVENTION

1. Field of the Invention

This invention relates in general to the processing and utilization of electrical signals, and more particularly to a system for processing bioelectrical signals generated in the nervous system of a living organism and a method for training the organism to control the patterns of its bioelectrical signals for therapeutic or other purposes.

2. Prior Art

The prior art does not disclose a method or means whereby a living organism can learn to control the bioelectrical brainwave or nervewave patterns generated in its own nervous system. Methods are known in the prior art whereby bioelectrical signals generated in the brain are sensed and fed back in synchronism with the generated signals so as to produce prolonged sleep and anesthesia. In the prior art methods, electrodes are used to impress the feedback signal directly upon the subject's brain, bypassing its sensory mechanism; consequently, no participation or learning is required on the part of the subject. These methods, therefore, do not enable an organism to control its nervous system. Instead, they enable a passive subject to be put to sleep or to be anesthetized. The present invention, on the other hand, teaches the conscious participation of the subject. By this invention, the feedback signal, typically an audio or visual output, is impressed upon the subject's senses, requiring the subject's conscious and voluntary response to the signal. Unlike the methods of the prior art, the subject's sensory mechanism is not bypassed by directly and electrically impressing the feedback signal upon its brain.

There are also substantial differences between the invented system and some of those disclosed by the prior art. For example, biological feedback systems of the prior art often use a carrier signal modulated by the biolelectrical signal. No such modulation is part of the present invention. Systems of the prior art often include means for shifting the phase of the feedback signal with respect to the original bioelectrical signal. In the present invention, the phase relationship between the bioelectrical signal and the feedback signal is of no particular importance. Further, the present invention does not require means for impressing an electrical signal and, therefore, electrical current, into a living organism. Consequently, it is substantially safe to its subjects while they are being treated or otherwise participating in the invented method.

Heretofore, disorders of the nervous system, such as epilepsy, have been treated exclusively by pharmaceuticals and/or surgical procedures. The present invention is based upon the discovery that a living organism, typically an animal high on the intelligence scale, can control its brainwave and nervewave patterns and bring about permanent or long lasting changes thereto by a process of learning; and, further, that the changes induced in the bioelectrical patterns can be such as to result in the substantial control of epileptic seizures and hyperkinesis. This therapeutic approach has also been shown to be useful in correcting motor disorders such as the loss of motor control attributable to a spinal cord lesion. Thus, the present invention provides a safe and practical method and system enabling the application of this discovery in many fields including neurological therapy and brain research.

BRIEF SUMMARY OF THE INVENTION

The present invention is comprised of a means for detecting bioelectrical signal generated in a specific topological region of the nervous system of a living organism, typically a human being or other intelligent animal; a means for detecting particular characteristics of the detected bioelectrical signal; means for processing the signal so as to produce an output related to the presence or absence, magnitude and/or duration of the detected characteristics; and a means for transducing the output into a sensory signal presented to the organism.

The invented method requires the subject organism, utilizing its cognitive powers, to alter the particular characteristics of the detected bioelectrical signal so as to cause the sensory signal displayed to it to change to a preconceived condition, such as, for example, to increase the intensity of a light source. The preconceived condition of the sensory signal, of course, is related to a desired waveform pattern of the originally detected bioelectrical signal or, more specifically, to the attainment of one or more desired characteristic of that signal, such as, for example, the elimination of frequency components found in the brainwave patterns of persons suffering from epilepsy. By repeatedly exercising a subject in the manner just described, i.e., by extensive training utilizing the present invention, the subject can learn to control and, therefore, to determine one or more characteristics of its brainwave or nervewave patterns for therapeutic or other purposes.

Typical means for detecting the bioelectrical signal are the electroencephalograph (EEG) recorder and the polygraph recorder. The topological location in the organism's nervous system where detection is to take place is a function of the user's objective. Thus, if the present invention is to be used for epileptic therapy, the region of the brain known to be involved in epileptic seizures would be subjected to the EEG investigation. Conversely, where there is now inadequate correlation between the topology of the nervous system and its functions, the present invention provides a useful research tool capable of substantially enhancing the topological "mapping" of an organism's nervous system.

The particular characteristics of the detected bioelectrical signal which are of interest to the user are also a function of his objective. In the case of epileptic therapy, for example, the presence and amplitude of certain frequency components in the clincial EEG has been correlated with seizures. Thus, in this application, it is the frequency spectrum of the bioelectrical signal which is of interest.

In other applications it might be found that it is only necessary to detect the presence or absence of electrical or electrochemical activity at a particular location in the nervous system. For such applications, the invented system would include means for detecting the presence of a signal rather than any particular electrical characteristic of it. In still other applications the duration for which a bioelectrical signal is present may be a significant parameter requiring detection. For this reason it should be understood that the invented system is not a fixed single structure but rather a basic combination of means whose specific embodiments are adapted to suit particular applications. Similarly, the invented system is typically tuned and calibrated in accordance with the requirements of each application to which it is to be applied. This invention also contemplates the combination of means sufficient to enable multi-purpose use in a number of applications either simultaneously or by sequential selection.

Thus, it is a principal object of this invention to provide a practical and safe method and system to enable a living organism to control signficant characteristics of its nervous system.

Another principal object of this invention is to provide a therapeutic means for the control of certain disorders of the nervous system.

A still further object of the invention is to provide a flexible tool for neurological research including topological mapping of the nervous system.

Other objects, novel features and advantages of the present invention will become apparent upon making reference to the following detailed description and the accompanying drawings. The description and the drawings will also further dislose the characterstics of this invention, both as to its structure and its mode of operation. Although preferred embodiments of the invention are described hereinbelow, and shown in the accompanying drawing, it is expressly understood that the descriptions and drawings thereof are for the purpose of illustration only and do not limit the scope of this invention.

BRIEF DESCRIPTION OF THE DRAWINGS

FIG. 1 is a block diagram of a first preferred embodiment of the invented system.

FIG. 2 is a functional-block diagram of a second preferred embodiment of the invented system having certain additional capabilities as required in more complex applications.

DETAILED DESCRIPTION OF THE INVENTION

With reference to FIGS. 1 and 2 the invented system is now described in detail. Like elements in each figure will be designated by like numerical designations. The invented method will be described in conjunction with the description of the operation of the system. For the purposes of this description the living organism will be a human being and the portion of the nervous system involved will be the brain. It should be understood, however, that the invention is not so limited.

In FIG. 1, a human subject 10 is shown with a conventional set of electrodes 12 affixed to his skull. The electrodes 12 detect the bioelectrical signals generated in the topological region of the brain at which they are affixed, such signals being commonly referred to as EEG signals. The electrodes 12 are connected to an amplifying means 14. Amplifying means are typically incorporated in commercial EEG and polygraph recorders. When a recorder is used to provide the amplifying means, the EEG signal may, of course, be displayed on the output paper chart paper. Such display of the EEG signal is advisable at the onset of the training and periodically thereafter for the benefit of the therapist in charge of the operation.

The amplified EEG signal is then routed to a precision attenuator 16 in series with an active precisely calibrated and tuned bandpass filter 18, i.e., a filter having some gain. Filter 18 is required in applications wherein a particular frequency band is of interest because its presence, energy content and/or the duration of its presence are parameters of significance to the therapeutic or research objective of the user. In any event, some filtering is typically required in order to filter out signals attributable to cardiac and muscular responses as well as noise from the ambient environment. The precision attenuator is adjusted so that the filtered signal appearing at the output 19 of the bandpass filter 18 has a sufficient amplitude, typically one volt, peak to peak. A terminal may be provided at output 19 of filter 18 to enable the display of the filtered EEG signal. Such a display can be of use during operation of the system. When an EEG or other recorder is used, the signal at the point 19 may be patched to one of the recording tracks of the recorder, since most commercial recorders provide means for such external inputs.

The filtered EEG signal is then passed through a means for rectifying 20. In applications where the sensory signal to be fed back to the subject is an analog of a particular characteristic of the EEG signal, full wave rectification is preferred for greater accuracy of the analog relationship. However, in applications wherein the sensory feedback signal is not an analog signal, e.g., where it is a tone or a light indicating the presence of the particular characteristic of interest, then half wave rectification is adequate. The output 21 of the rectifying means 20 is a unipolar signal whose peak amplitude is directly proportional to the amplitude of the frequency components passed by the filter 18; thus, the rectified signal is a measure of the presence of, and energy in, the selected frequency band of the EEG signal. A terminal may be provided at point 21 of rectifying means 20 for purposes of display.

Following rectification, the DC signal is typically integrated by an integrating means 22 such as for example, an operational amplifier integrator, having a charge time constant Tc and a discharge time constant Td. The values of Tc and Td are selected so that, for a particular frequency band, the signal at output 23 of integrating means 22 is directly proportional to the RMS amplitude of the rectified signal at point 21. When, for example, the frequency of the filtered EEG signal is about 13 Hz, Tc and Td are set at approximately ¼ second. In addition, the aforesaid value of Tc and Td substantially eliminates flickering of any light source driven by integrating means 22, to provide the sensory signal to the subject. Flickering, of course, is typically disturbing to the subject 10. Integrating means 22 also acts as a filter of any high frequency components of the rectified signal, as well as of any noise spikes passing through. As elsewhere in the invented system, a terminal may be beneficially placed at point 23 to enable the monitoring of the output of integrating means 22.

In the embodiment depicted in FIG. 1, the integrating means 22 directly drives an output transducing means 24. This is typical in applications where the sensory signal which is fedback to the subject 10 is to be an analog of the characteristic of interest in the EEG signal. Preferred transducing means 24 which provide such an analog sensory signal include a light emitting diode, an incandescent lamp or illuminating panel whose intensity of illumination is proportional to the voltage applied across it, an audio device whose sound intensity is directly related to the voltage applied to it, and any conbinations of such devices. In some applications the sensory signal fedback to the subject 10 is not an analog of the characteristic of interest in the EEG signal. For example, the subject 10 may be stimulated by a discrete change in a number display or in a visual display (such as, e.g., in colored slides projected on a screen) whenever the characteristic of interest is detected in the EEG signal. A preferred transducing means 24 for such applications is a light display comprised of two rows of numbered lamps driven by an electronic counter. One row of lamps designates "tens" while the second row designates "units." Only one lamp in each row is lit at any given time. The subject 10 can readily read the number by observing which numbered lamp is lit in each row. When the desired characteristic is detected in the EEG signal, the subject 10 is "rewarded" by observing an increase in the number displayed by the lamp. A single chime may accompany each advance of a units lamp and a double chime each advance of a tens lamp, thereby adding audio stimulation to the subject.

In some applications the duration of the detected characteristic of the EEG signal and/or a particular magnitude thereof are significant parameters. Typically, these are applications where bioelectrical activity within a certain bandwidth is of significance only if it is of a particular magnitude and/or it persists for a particular duration. For applications of this kind, time measuring means and amplitude sensing and comparing means are employed between the integrating means 22 and the output transducing means 24 for the purposes of further processing the signal. Such a more complex second embodiment of the invented system, adapted for use in such applications, is now described in detail with reference to FIG. 2. The second embodiment comprises electrodes 12, amplifying means 14, attenuator 16, active bandpass filter 18 rectifying means 20 and integrating means 22 interconnected in electrical series in the manner described hereinabove with respect to the first embodiment shown in FIG. 1. In this second embodiment, a means for sensing amplitude 30 receives the integrated signal present at point 23. The amplitude sensing means 30 may include voltage comparator circuitry, Schmitt triggers or relay tripping ciruitry, to name just some of the possibilities. The basic function of the amplitude sensing means 30 is to provide a signal at its output 31 only if and when the signal at its input 23, typically the integrated signal, has an amplitude of some minimum or specific magnitude.

The second embodiment of this invention also includes a timing circuit 32 which provides additional control functions governing the sensory signal which is to be fed back to the subject 10. Timing circuitry 32 is normally driven by the output of the amplitude sensing means 30. It provides whatever timing functions are required by the particular application such as, for example, (i) sensing the duration of the processed signal; (ii) controlling the intertrial interval and/or (iii) controlling the duration of the sensory signal stimulating the subject 10. The duration sensing function is typically implemented by conventional timing circuits which determine whether the processed signal at point 31 is of a minimum or other specific duration as a condition to enabling an output to transducing means 24. The intertrial interval control function controls the time interval elapsing between the presentation of successive feedback sensory signals to the subject 10 in applications where the subject 10 is stimulated by a discrete change in a visual and/or audio presentation. For example, whe the transducing means 24 is the light display comprised of two rows of numbered lamps described hereinabove, the duration sensing function of the timing circuit 32 would enable an output to the electronic counter only if the detected characteristic persisted for a specified duration. (The electronic counter, in turn, simultaneously causes the lamps to advance by one unit.) The intertrial interval control function then determines the minimum time interval before another advance in the number display can be made. This feature enables the subject 10 to see and appreciate the reward for his efforts represented by the advance in the number display. The sense of being rewarded is typically diminished in a subject 10 when the sensory signal is changing too rapidly.

The control functions of the timing circuit 32 may be selectable or variable, i.e., timing circuit 32 may include means for continuously or discretely changing the various time criteria. These functions and capabilities may be readily implemented by conventional electronic circuits known in the electronics field.

In some applications it is desirable to provide a means for inhibiting a sensory output to the subject under certain conditions. Such an inhibiting means 40 is shown in FIG. 2 between the timing circuit 32 and transducing means 24. When a condition requiring suppression of a sensory signal to the subject 10 is detected, inhibiting means 40 prevents any signal appearing at the output of timing circuit 32 from reaching transducing means 24. Inhibiting means 40 can be implemented by electronic circuits known in the field; e.g., if timing circuit 32 requires a charging circuit to fire in order to produce an output, the inhibiting circuit can be designed to discharge the charging circuit upon detection of a condition requiring suppression of the sensory signal.

Conditions typically requiring suppression of the sensory signal include (i) excessively high EEG signal amplitudes at one or more points in the system; (ii) epileptic spikes characteristically observed during an epileptic seizure; and (iii) the presence of excessive "noise" attributable to bioelectrical activity in the subject's muscular apparatus; i.e., the subject's electromyograph (EMG). In epilepsy therapy it has been observed that an epileptic seizure produces characteristic spikes within the frequency band of a normal brainwave pattern. If such spikes appear during a therapeutic session, their presence, superimposed on a normal brainwave pattern, is inconsistent with the presentation of a sensory signal (which, as more fully discussed below, is an indication of a favorable pattern; i.e., a "reward" to the subject).

Detection of excessive muscular noise is done by means of electrodes (not shown), affixed to the body of the subject 10 at an appropriate location, in conjunction with an EMG recording. The detected EMG signal is amplified, filtered, rectified and integrated by processing means 52 in a manner similar to that described hereinabove with respect to the EEG signal. It should be understood that processing means 52 is merely a convenient representation of a series of elements comprised of amplifying means, precision attenuator, active bandpass filter, rectifying means and integrating means. Amplitude sensing means 54 receives the processed EMG signal. If the amplitude of the processed EMG signal is determined by amplitude sensing means 54 to be above a predetermined magnitude, an inhibit signal appears at its output 55. The presence of an inhibit signal at point 55 activates inhibiting means 40.

Detection of excessively high EEG signal amplitudes or characteristic epileptic spikes requires still another amplitude sensing means 64. (It has been observed that the epileptic spikes often have high amplitudes, or they "ride" atop the amplitude waveform of the EEG signal, thereby reaching high levels at their peaks.) The EEG signal is picked off at the output 15 of amplifying means 14 and passed through processing means 62 before being input to amplitude sensing means 64. Processing means 62 is a convenient representation of a series of elements comprising a precision attenuator, a very broadband active filter, rectifying means and integrating means having a very low charge time constant Tc. Processing means 62 passes substantially all of the frequency components of the EEG signal with minimum delay. If the amplitude of the EEG signal appearing at the output 63 of processing means 62 is determined by amplitude sensing means 64 to be above a predeteremined magnitude, an inhibit signal appears at its output 65. The presence of an inhibit signal at point 65 activates inhibiting means 40.

It should be understood that while only two embodiments have been described in detail, many variations are possible as a function of the requirements of each application. For example, in some applications rectifying and integrating means 20 and 22 respectively, may not be required; i.e., the amplitude sensing means 30 may directly receive the filtered signal at point 19. In other cases, the integrating means 22 alone may be eliminated. The appropriate configuration for a given application can be readily determined by persons skilled in the subject field. Further, it should be understood that many circuits and physical means are known which can be used to implement one or more of the functional elements disclosed herein including, for example, a digital computer. Thus, the principles disclosed herein are susceptible of other applications and forms which will be apparent to persons skilled in the field. Therefore, this invention is not intended to be limited to the particular embodiments herein disclosed.

The inventive method is practiced using the above described system. The subject 10 is first placed in a position relative to the transducing means 24 which will enable the sensory signal output by such means 24 to stimulate him; e.g., enable him to see a display light or hear an audio tone. The subject 10 is then fitted with electrodes 12 at the specific topological area of his nervous system selected by the therapist or experimenter. The precision attenuator 16 and bandpass filter 18 are properly adjusted and calibrated; timing criteria, if any, are set into the timing circuit 32; and any amplitude criteria set into the amplitude sensing means 30. Typically, the filter is selected to pass desired frequencies detected in the EEG signal, i.e. frequencies which have been correlated with normal brainwave or nervewave patterns. Likewise, the amplitude and duration criteria are also related to normal patterns. Thus, the sensory signal to be fed back to the subject 10 is an indication to him of normal or desirable patterns. Receipt of the sensory signal, therefore, is in the nature of a reward to the subject 10, and he is instructed to concentrate, think and/or use his willpower so as to obtain the desired sensory signal. In the case of epileptic seizure suppression, for example, the center frequency of active bandpass filter 18 is typically set at about 13 Hz. The gain of the precision attenuator is set to produce a peak to peak voltage in the range of 0–3 volts at output 19 of bandpass filter 18. The amplitude sensing means is set to provide an output if the signal at point 19 has a peak to peak amplitude of at least one volt for a few cycles. With reference to the timing circuit 32, the duration sensing function is typically set to respond to durations of the desired characteristic of from ½ to 1 second. Typical intertrial intervals are from 1–5 seconds.

After a period of intensive training in the practice of the invented method, the subject 10 can bring about permanent or long lasting changes to the characteristic pattern of the detected EEG signal. For therapeutic purposes the desired characteristics of a particular EEG signal can be enhanced while undesirable characteristics reduced, resulting in a beneficial change in the subject's clinical EEG. Further, the present invention can be of value in analyzing the subject's clincial EEG. While it is not yet clear how and in what manner the subject's cognitive powers bring out changes in the brainwave or nervewave patterns, such results have been observed and reported. When timing circuit 32 is utilized, the required duration of a desired characteristic may be gradually increased so that the subject 10 must strive further in order to achieve the reward. This aspect of the method is analogous to the procedure of increasing the number of exercises in a program of physical training.

Other variations and applications of the invented method will be apparent to persons skilled in this field without departing from the spirit and scope of this invention. This invention, therefore, is not intended to be limited to the particular method disclosed herein.

I claim:

1. A method of controlling the nervous system of a living organism by altering the waveform pattern of a bioelectrical signal generated in its nervous system, comprising the steps of:

a. detecting a bioelectrical signal at a specific topological location in said organism's nervous system;

b. passing said bioelectrical signal through a bandpass filter, said filter being adapted to pass only frequency components thereof which are related to the particular control sought;

c. passing said frequency components of said bioelectrical signal through a timing circuit, said timing circuit being adapted to detect whether said frequencies are present for a preselected minimum duration;

d. providing an output signal when and if said frequency components are present for said preselected minimum duration;

e. detecting the presence of any undesirable characteristics of said bioelectrical signal, said undesirable characteristic being one whose presence warrants inhibiting said method;

f. applying said output signal to a voltage transducing device for a preselected duration so long as no undesirable characteristic is detected, said device providing a sensory signal capable of stimulating at least one of the senses of said organism, said sensory signal having a discrete state related to the waveform pattern of said bioelectrical signal; and g. causing said organism to concentrate mentally so as to affect the intensity or state of said sensory signal in a preselected way;

whereby said organism is trained to alter the waveform pattern of said bioelectrical signal in a desired manner and thereby to control its nervous system.

2. The method of claim 1 wherein said undesirable signals include excessively high amplitude EMG signals attributable to bioelectrical activity in said organism's muscular apparatus.

3. The method of claim 1 including the additional steps of (i) detecting the presence of any undesirable signal which may appear together with said bioelectrical signal, said undesirable signal being one whose presence warrants inhibiting said method, and (ii) inhibiting the presentation of said sensory signal to said organism when said undesirable signal is detected.

4. The method of claim 1 wherein said undesirable characteristics include the high amplitude spikes which may appear during epileptic seizures.

5. The method of claim 1 wherein said undesirable characteristics include amplitudes of said bioelectrical signal which are greater than a preselected magnitude.

6. The method of claim 1 wherein said bioelectrical signal is altered so as to increase the amplitude of said frequency components passed by said filter.

7. The method of claim 6 including the additional step of passing said frequency components through amplitude sensing means and providing an output signal when and if the amplitude of said frequency components is above a preselected magnitude.

8. The method of claim 1 wherein a preselected minimum interval elapses between successive presentations of said sensory signal or changes in the state thereof.

9. The method of claim 1 wherein said sensory signal is an audio signal whose state is directly related to the degree to which the alteration of said waveform pattern is achieved, said organism concentrating mentally so as to change said state in a preselected manner.

10. The method of claim 1 wherein said sensory signal is a visual display whose state is directly related to the degree to which the alteration of said waveform is achieved, said organism concentrating mentally so as to change said state in a preselected manner.

11. The method of claim 1 wherein said sensory signal is a combination of visual and audio signals.

12. The method of claim 1 including the additional steps of rectifying and integrating said bioelectrical signal after it has passed through said bandpass filter.

13. A method of controlling the nervous system of a living organism by altering the waveform pattern of a bioelectrical signal generated at a sepcific topological location in its nervous system, said waveform pattern being altered so as to increase the energy content in a preselected frequency band thereof, comprising the steps of:

a. detecting said bioelectrical signal at said topological location;
b. passing said bioelectrical signal through a narrow bandpass filter adapted to pass only frequencies within said frequency band;
c. rectifying said bioelectrical signal;
d. integrating said bioelectrical signal;
e. passing said bioelectrical signal through means for sensing voltage amplitude, said means being adapted to detect whether the amplitude thereof is above a preselected magnitude and to provide a first signal as long as said amplitude remains thereabove;
f. passing said first signal through a timing circuit adapted to detect whether frequencies within said frequency band are present for at least a preselected duration;
g. providing a second signal when and if said bioelectrical signal contains frequencies in said frequency band with an amplitude above said preselected magnitude for at least said preselected duration;
h. detecting the presence of high amplitudes of or spikes on said bioelectrical signal;
i. applying said second signal to a voltage transducing device for a preselected period so long as no high amplitudes or spikes are detected, said device being adapted to provide a visual display whose state is directly related to the degree of success in increasing the energy content in said frequency band of said bioelectrical signal; and
j. causing a preselected minimum interval to elapse between successive presentations of said sensory signal or changes in the state thereof;
k. causing said organism to concentrate mentally so as to change the state of said visual display in successive steps, said successive steps occurring at preselected intervals;

whereby said organism is trained to increase the energy content in said frequency band of said bioelectrical signal and thereby to control its nervous system.

14. A system for controlling the nervous system of a living organism by altering the waveform pattern of a bioelectrical signal generated in its nervous system comprising:

a. means electrically responsive to said bioelectrical signal;
b. means for amplifying said bioelectrical signal, said amplifying means being electrically coupled to said responsive means;
c. a bandpass filter having an input which is electrically coupled to the output of said amplifying means, said filter being arranged and constructed to pass only frequency components which are related to the particular control sought;
d. means for sensing the duration of said frequency components passed by said filter, said duration sensing means being electrically coupled to the output of said filter and being arranged and constructed to provide an output signal when and if said frequencies are present for a preselected minimum duration;
e. means for detecting the presence of any undesirable characteristic of said bioelectrical signal, the input of said detecting means being electrically coupled to the output of said amplifying means;
f. means for transducing said output signal into a sensory signal having a preselected duration, said sensory signal being capable of stimulating at least one of the senses of said organism, said transducing means being electrically coupled to the output of said duration sensing means, said sensory signal having discrete states related to the waveform pattern of said bioelectrical signal; and g. means for inhibiting the appearance of said output signal whenever any undesirable characteristic is detected, the input of said inhibiting means being electrically coupled to said detecting means and the output thereof being electrically coupled to said duration sensing means;

whereby said organism is trained to alter said waveform pattern of said bioelectrical signal in a desired manner by concentrating mentally so as to affect the state of said sensory signal in a preselected way.

15. The system of claim 14 wherein said means electrically responsive to said bioelectrical signal are electrodes adapted to be coupled to said organism.

16. The system of claim 14 wherein said filter is electrically coupled to said amplifying means through a precision attenuator adjusted to provide a desired voltage amplitude.

17. The system of claim 14 wherein said duration sensing means is electrically coupled to the output of said filter through serial means for rectifying and integrating said bioelectrical signal.

18. The system of claim 17 having in addition thereto a light emitting device electrically coupled to the output of said integrating means, the illumination of said device being proportional to the voltage applied across it.

19. The system of claim 14 having in addition thereto means for sensing voltage amplitude, said amplitude sensing means being electrically coupled between said filter and said duration sensing means, said amplitude sensing means being arranged and constructed to provide an output to said duration sensing means when and if the amplitude of said frequency components is above a preselected magnitude.

20. The system of claim 14 wherein said undesirable characteristics of said bioelectrical signal include excessively high amplitudes or spikes, and said detecting means comprises (i) an attenuator; (ii) a very broadband filter; (iii) means for rectifying; (iv) means for integrating and (v) means for sensing voltage amplitude, said components being electrically coupled in series.

21. The system of claim 14 having in addition thereto second means for detecting the presence of any undesirable signals which may appear together with said bioelectrical signal, the input of said second detecting means being adapted to be electrically coupled to said organism and the output thereof being electrically coupled to said inhibiting means.

22. The system of claim 21 wherein said undesirable signals include excessively high amplitude EMG signals attributable to bioelectrical activity in said organism's muscular apparatus, said second detecting means comprising (i) at least one electrode; (ii) an amplifier; (iii) an attenuator; (iv) means for rectifying; (v) means for integrating; and (vi) means for sensing voltage amplitude, said components being electrically coupled in series.

23. The system of claim 14 having in addition thereto a timing circuit adapted to control the minimum interval between successive presentations of said sensory signal to said organism.

24. A system for controlling the nervous system of a living organism by altering the waveform pattern of a bioelectrical signal generated in its nervous system so as to increase the energy content in a preselected frequency band thereof comprising:

a. electrodes adapted to be coupled to specific topological locations in said organism's nervous system;

b. means for amplifying and attenuating said bioelectrical signal, said amplifying and attenuating means being electrically coupled to said electrodes and adjusted to achieve a desired voltage amplitude;

c. a bandpass filter having an input which is electrically coupled to the output of said amplifying and attenuating means, said filter being arranged and constructed to pass only frequencies within said frequency band;

d. means for rectifying and integrating said bioelectrical signal electrically coupled to the output of said filter, the output of said rectifying and integrating means being unipolar and having a peak amplitude directly proportional to the amplitude of the frequency components passed by said filter;

e. means for sensing voltage amplitude electrically coupled to said rectifying and integrating means, said amplitude sensing means being arranged and constructed to provide an output when and if the amplitude of said frequency components thereof is above a preselected magnitude;

f. means for sensing the duration of said frequency components passed by said filter, said duration sensing means being electrically coupled to the output of said amplitude sensing means and being arranged and constructed to provide an output signal when and if said frequencies are present for a preselected minimum duration;

g. means for detecting the presence of excessively high amplitudes or spikes in said bioelectrical signal, said detecting means being electrically coupled to the output of said amplifying means;

h. means for transducing said output signal into a visual display whose state is directly related to the degree of success in increasing the energy content in said frequency band of said bioelectrical signal, said transducing means being electrically coupled to the output of said duration sensing means;

i. a timing circuit electrically coupled between said duration sensing means and said transducing means, said timing circuit being arranged and constructed to control the duration of said visual display and the minimum interval between successive presentations or changes in the state thereof; and j. means for inhibiting the appearance of said output signal whenever excessively high amplitudes or spikes are detected in said bioelectrical signal, the input of said inhibiting means being electrically coupled to said detecting means and the output thereof being electrically coupled to said duration sensing means;

whereby said organism is trained to increase the energy of content in said frequency band of said bioelectrical signal by concentrating mentally so as to change the state of said visual display in a preselected way.

* * * * *

UNITED STATES PATENT OFFICE
CERTIFICATE OF CORRECTION

Patent No. 3,837,331　　　　　Dated September 24, 1974

Inventor(s) Sidney A. Ross

It is certified that error appears in the above-identified patent and that said Letters Patent are hereby corrected as shown below:

On the Cover Sheet, in item [76],

"10535 Cedros Ave., Mission Hills, California"

should read

-- 6901 Katherine Avenue, Van Nuys, California 91405 --.

Signed and sealed this 6th day of May 1975.

(SEAL)
Attest:

RUTH C. MASON
Attesting Officer

C. MARSHALL DANN
Commissioner of Patents
and Trademarks